2,930,788
PRODUCTION OF SOLID POLYMER

Robert L. Banks, Bartlesville, Okla., assignor to Phillips Petroleum Company, a corporation of Delaware No Drawing. Application January 22, 1957
Serial No. 635,114

8 Claims. (Cl. 260—94.9)

This invention relates to the production of solid polymeric materials. In one aspect, the invention relates to a process for polymerizing ethylene in the presence of a catalyst which is novel for this purpose. In another aspect the invention relates to new polymers. In another aspect, the invention relates to the production of catalysts.

The polymers produced according to this invention are thermoplastic, normally solid materials. They are useful for those applications known for polyethylenes in general such as the production of molded articles such as containers for liquids. The polymers can be extruded to form rods, pipes, tubes, or sheets. They can also be fabricated into films (by rolling, inflating or extruding) which are useful for the packaging of foods, drugs, and other articles and materials. The polymers can be added to other polymers such as natural and synthetic rubber, polystyrene, and polyethylenes made by other methods in order to impart desired properties to these materials.

According to this invention, ethylene is polymerized to form solid polymer by contacting with a catalyst comprising iron oxide associated with silica and alumina.

The catalyst for the process generally contains a minor proportion of iron oxide, and the iron oxide content is ordinarily in the range from about 1 to about 10 weight percent, based on the total weight of catalyst. The material with which the iron oxide is associated is preferably a silica-alumina composite of the type generally utilized as a catalyst in the prior art of catalytic cracking. This composite can be produced by any of the methods known in the prior art, e.g. coprecipitation, deposition of silica on alumina, or vice versa, or by the acid treatment of certain naturally occurring silicates such as clays. A highly satisfactory material is a coprecipitated gel comprising a major proportion of silica and a minor proportion of alumina. However, the alumina can predominate in the composite. Generally, it is preferred to use a silica-alumina composite which contains from 0.5 to about 20 weight percent of alumina, the remainder being silica. A large variety of silica-alumina composites of this general type is available on the market and well known to those skilled in the art. The iron oxide can be associated with the silica-alumina in any desired manner. For example, the silica alumina composite can be milled in a ball mill together with granular solid iron oxide. Alternatively, the iron oxide can be coprecipitated with the silica-alumina composite. A method which has been found highly satisfactory for the preparation of catalyst according to this invention comprises depositing an iron compound calcinable to iron oxide (e.g. ferric nitrate, ferric acetate, ferric carbonate, ferric hydroxide, or the iron citrates) on a preformed silica-alumina composite and subsequently heating the resulting composite. In one embodiment, the catalyst can be prepared by impregnating the silica-alumina composite with an aqueous solution of an iron salt calcinable to iron oxide, draining off excess liquid, drying the resulting compounds, e.g. at temperatures in the range 200 to 350° F., and subsequently heating the dried composite, preferably under non-reducing conditions. The heating stop following the drying can be conducted at a temperature in the range from about 350 to about 1500° F. and is preferably conducted in a vacuum or in a non-reducing atmosphere such as nitrogen, helium, argon, carbon dioxide, oxygen or air. Hydrogen, carbon monoxide, or other reducing gases can be present, but if these are present the temperature and time should be limited so that reduction of all of the ferric iron is not obtained. It is generally preferred that the heating step be conducted in the presence of an oxidizing gas such as oxygen or air and that the atmosphere be substantially dry, i.e. that it have a dew point below about 0° F. A preferred range of activation temperatures is from about 600 to about 1300° F. The time of heating is regulated to obtain a substantial increase in the activity of the catalyst. Ordinarily, the time of heating is in the range from a few minutes to 50 hours or longer. Time and temperature of heating are intimately related so that shorter times are effective at higher temperatures and longer times are required at lower temperatures. In most cases, the time of heating is in the range from about 1 to about 10 hours.

The polymerization is generally conducted at a temperature below about 450° F. Ordinarily, the polymerization is conducted at a temperature from about 100 to about 450° F. and preferably from about 150 to about 330° F.

The pressure maintained during the polymerization step can range from atmospheric or lower to 1000 p.s.i. or higher. Ordinarily the pressure range is from about atmospheric to about 700 p.s.i. The ethylene can be present in the reaction zone in the gaseous and/or the liquid phase with or without a diluent. In many cases it is desirable to use a diluent which is liquid and inert under the conditions of polymerization, the pressure being maintained at a sufficiently high value to maintain the diluent substantially in the liquid phase. The reactor can be operated liquid-full, all of the ethylene being dissolved in the diluent. It is often preferable, however, to maintain a gas phase comprising chiefly ethylene in contact with the liquid in the reactor. This type of operation facilitates efficient operation and maintenance of a steady supply and concentration of ethylene in the reactor. It also facilitates pressure and concentration control.

The diluent used can be any material which is inert and nondeleterious under the reaction conditions. Preferably, the diluent is a hydrocarbon and more preferably it is a hydrocarbon selected from the group consisting of paraffinic and cycloparaffinic hydrocarbons. However, aromatic hydrocarbons can be used if desired. It appears that catalytic activity is generally higher in the absence of an aromatic hydrocarbon. Specific diluents which can be used are methane, ethane, propane, normal butane, isobutane, normal pentane, isopentane, normal hexane, the isohexanes, normal heptane, the isoheptanes, normal octane, and the isooctanes, e.g. 2,2,4-trimethylpentane. The nonanes, the decanes, the undecanes, and the dodecanes are also useful. Other suitable diluents are cyclopentane, methylcyclopentanes, the dimethylcyclopentanes, cyclohexane, methylcyclohexane, and the dimethylcyclohexanes. When a paraffinic hydrocarbon is used, it is preferred that it contain from 3 to 12 carbon atoms per molecule since these paraffins can readily be liquefied under the reaction conditions. Under certain circumstances, the cycloparaffins are preferred diluents on account of their relatively high solvent power for the product polymers.

The technique of contacting the hydrocarbon feed with the catalyst can vary, depending upon the results desired.

Fixed-bed contacting can be utilized, as can mobile catalyst techniques. Contacting with a fluidized or suspended catalyst, with the hydrocarbon feed in the liquid or gaseous phase is within the scope of the invention. Thus a satisfactory technique comprises suspending the catalyst in the liquid diluent, feeding such a suspension to the reaction zone, simultaneously supplying a gaseous stream of ethylene, agitating the mixture of ethylene, diluent and catalyst within the reaction zone, withdrawing an effluent, heating the effluent to a temperature from 10 to 50° higher than that in the reaction zone in order to effect complete solution of the polymer in the solvent, filtering to remove catalyst, recovering a filtrate, and recovering the dissolved polymer from the filtrate by vaporizing the solvent or diluent or by cooling the solution to precipitate the polymer and recovering the precipitated polymer. When fixed-bed contacting is used the space velocity is generally in the range from about 1 to about 20 liquid volumes of feed per volume of catalyst per hour. When a suspended catalyst technique is used, the residence time of the ethylene in the reaction zone is usually from about 15 minutes to about ten hours.

Methods of recovering the polymer can vary, depending upon the method of catalytic contacting utilized and upon the desired use to which the polymer is to be put. Thus, when fixed bed contacting is used, the effluent from the reaction zone can be processed for the production of light polymer and the contacting of feed with a given mass of catalyst can be interrupted from time to time to remove adhering polymer from the catalyst surface. This removal can be accomplished by the use of a hot solvent such as a hydrocarbon of the type already referred to. This removal is ordinarily accomplished at a temperature above that used for the polymerization. The removed heavy polymer fraction can then be recovered from solution in the solvent. When a mobile catalyst is utilized, the effluent from the reaction zone contains catalyst. Whether the catalyst is to be removed depends upon, among other things, the intended use of the polymer. In many cases, the final polymer is used for purposes which do not preclude the presence of relatively small amounts of solid catalyst. In such cases, the complete removal of catalyst is unnecessary. Where a colorless polymer or one which contains no inorganic impurities is desired removal of the catalyst is necessary. One method for removing the catalyst has already been described. Removal of polymer from admixture with hydrocarbons can be accomplished by methods already known. Thus the solvent can be removed by vaporization or the solution can be cooled to precipitate the polymer which can then be recovered by filtration or similar methods.

While the invention has been described chiefly in connection wtih the homopolymerization of ethylene to form solid polyethylene, minor amounts of other olefinic materials copolymerizable with ethylene can be present in the feed. Thus ethylene can be copolymerized with a relatively minor amount of propylene, 1-butene, 1-pentene, or 1,3-butadiene. Ordinarily the compound heavier than ethylene is present in minor amount, based on total olefin. Preferably, the heavier olefin is present in an amount from about 0.5 to about 20 weight percent, based on total olefin. Higher amounts tend to produce a polymer containing undesirably large amounts of liquid polymer.

*Example I*

The catalyst utilized in this example was prepared from ferric nitrate and a silica-alumina composite which had been prepared by coprecipitation of silica and alumina from solutions of sodium silicate and aluminum sulfate. This silica-alumina composite was a commercially available cracking catalyst containing 90 weight percent silica and 10 weight percent alumina. The silica-alumina composite in the form of pellets was dipped into an 0.76-molar aqueous solution of ferric nitrate nonahydrate for about 10 minutes. Excess solution was removed, and the solid composite was dried at temperatures up to 300° F. The dried composite was then heated in an electrically heated, stainless-steel tube for five hours at 950° F. in a stream of dry air (dew point below 0° F.) at a space velocity of 300 gaseous volumes of air per volume of catalyst per hour. One hundred cc. of the activated catalyst (62.5 grams) were charged to a vertical polymerization reactor constructed from a 30-inch section of one-inch pipe. A mixture of ethylene, ethane, and isooctane (2,2,4-trimethylpentane) were charged to the reactor for a period of four hours at the temperatures and pressures shown in the following table. The charge rates were: 13.0 grams of ethylene, 5.4 grams of ethane, and 412 grams of isooctane per hour. The reactor effluent was passed through a series of fractionation columns which served to isolate polymer as a residual fraction, isooctane as an intermediate fraction, and unreacted gas as a low-boiling fraction. Ethylene conversions were calculated from Orsat analysis of effluent unreacted ethylene-ethane mixture.

| Time on Stream, End of— | Reaction Temperature, °F. | Reaction Pressure, p.s.i.g. | Ethylene Conversion, Percent |
|---|---|---|---|
| 1 hour | 249 | 450 | 16 |
| 2 hours | 248 | 370 | 6 |
| 3 hours | 300 | 290 | 12 |
| 4 hours | 330 | 350 | 15 |
| Average ethylene conversion | | | 12 |

| | Grams |
|---|---|
| Polymer recovered in column kettle (heavy grease) | 0.6 |
| Polymer deposited on catalyst | 4.8 |
| Total | 5.4 |

The foregoing data show that the ferric oxide-silica-alumina catalyst according to this invention is effective in producing satisfactory yields of solid polymer. Unreacted ethylene can, of course, be recycled to the reactor. Similar results can be obtained when iron salts such as ferric acetate are used in place of ferric nitrate. Ferric sulfate and ferric carbonate can also be used although they are somewhat less deirable because the ferric sulfate is more difficult to calcine than is the nitrate and the ferric carbonate must usually be handled in aqueous suspension rather than in aqueous solution. However, ferric carbonate can be converted to the bicarbonate by the use of carbon dioxide and thus handled, at least partially, in solution. The ferric salts can also be handled in the form of complexes with hydroxy acids such as citric acid which render the iron salts soluble in aqueous solution under conditions at which the iron would otherwise be precipitated. These solutions can be used to impregnate silica-alumina and form catalysts according to this invention.

The polymer recovered as shown in this example can be utilized in the form of the individual fractions recovered, or the fractions can be recombined, the light fraction recovered from the reactor effluent acting as a plasticizer or processability improver for the heavier polymer. The polymer obtained is utilizable for the purposes for which polyethylene generally can be utilized, e.g. molding, forming pipe or tubing or fabrication of film.

*Example II*

A catalyst was prepared by treating 200 ml. of dry silica-alumina (14 to 28 mesh) of the type described in Example I for 30 minutes with an aqueous solution of ferric nitrate. The resulting mixture was filtered in a Buechner funnel, and the filter cake was dried in an oven at 110° C. The dried composite was heated at a temperature in the range 900 to 950° F. for about six hours in a stream of dry air. The catalyst contained approximately 5 weight percent iron, predominantly in the form of ferric oxide.

The reactor used was fabricated from an 8-inch section of ½-inch pipe fitted with a metal screen in the lower end to support the catalyst bed. A thermocouple well extended along the axis of the pipe and contained two movable thermocouples. The reactor was heated by an electrical furnace.

Ethylene was contacted with pyrogallol to remove oxygen and was subsequently dried by contact with a silicate desiccant. The ethylene was mixed with dry, oxygen-free cyclohexane and passed through the reactor. The flow rates of ethylene entering and leaving the system were determined, as a basis for calculating ethylene conversion. Twenty-five ml. of the catalyst (14.2 grams) was present in the reactor during the runs.

During the polymerization, the ethylene space velocity was 600 volumes of gaseous ethylene per volume of catalyst per hour. The space velocity of the cyclohexane diluent was three liquid volumes per volume of catalyst per hour. In one run at 150° F., an ethylene conversion of 11 percent was obtained. The polymer formed was substantially completely solid, there being substantially no yield of butene or normally liquid polymer. At a reaction temperature of 300° F., the total reaction product was solid polymer and was formed in such a yield that the catalyst became covered with polymer and the run had to be terminated for polymer recovery.

Silica-alumina, unpromoted with iron oxide, and treated in substantially the same manner as the silica alumina utilized in the catalyst preparation described, produced a much lower yield of solid polymer than that described above.

The solid polymer formed in the foregoing runs had properties similar to those described in Example I.

The catalyst can also be used as a slurry in the hydrocarbon solvent. The catalyst can be in the form of 20–70 mesh, or finer, particles and the concentration in the slurry can be from 0.1 to 30 weight percent, although these values are not absolute limits.

While certain compositions, examples, and process steps have been described for purposes of illustration, it is clear that the invention is not limited thereto. Variation and modification are possible within the scope of the disclosure and claims.

I claim:

1. A process which comprises contacting ethylene at a temperature in the range 100 to 450° F. with a catalyst active for ethylene polymerization and consisting essentially of a minor proportion of iron oxide associated with a major proportion of a silica-alumina composite to form a normally solid polymer of ethylene.

2. A process according to claim 1 wherein the ethylene is accompanied by from 0.5 to 20 weight percent, based on total olefin, of a heavier olefin selected from the group consisting of propylene, 1-butene, 1-pentene, and 1,3-butadiene.

3. A process which comprises contacting ethylene at a temperature in the range 150 to 330° F. with a catalyst active for ethylene polymerization and consisting essentially of about 1 to about 10 weight percent of iron oxide associated with about 90 to about 99 weight percent of a silica-alumina composite and recovering a normally solid polymer of ethylene.

4. A process which comprises contacting ethylene, in admixture with a diluent which is liquid, inert, and nondeleterious under the reaction conditions, at a temperature in the range 150 to 330° F. and a pressure sufficient to maintain said diluent in the liquid phase, with a catalyst active for ethylene polymerization and consisting essentially of about 1 to about 10 weight percent of iron oxide associated with about 90 to about 99 weight percent of a silica-alumina composite, and recovering a normally solid polymer of ethylene.

5. A process which comprises contacting ethylene, in admixture with a diluent selected from the group consisting of paraffins and cycloparaffins which are liquefiable under the polymerization conditions, at a temperature in the range 150 to 330° F. and a pressure sufficient to maintain said diluent substantially in the liquid phase, with a catalyst active for ethylene polymerization and consisting essentially of about 1 to about 10 weight percent of iron oxide associated with about 90 to about 99 weight percent of a silica-alumina composite, and recovering a normally solid polymer of ethylene.

6. A process which comprises contacting ethylene at a temperature in the range of about 100 to about 450° F. with a catalyst prepared by impregnating a silica-alumina composite with an aqueous solution consisting of a ferric compound calcinable to ferric oxide, drying the resulting composite, and heating at an elevated temperature in the range of about 350 to about 1500° F. and for a sufficient time to produce a substantial activation of said catalyst for said process, and recovering a normally solid polymer of ethylene.

7. A process which comprises contacting ethylene at a temperature in the range of about 100 to about 450° F. with a catalyst prepared by impregnating a silica-alumina composite with an aqueous solution consisting of a ferric compound calcinable to ferric oxide, drying the resulting composite, and heating in a nonreducing atmosphere at a temperature in the range of about 350 to about 1500° F. and for a sufficient time to produce a substantial activation of said catalyst for said process, and recovering a normally solid polymer of ethylene.

8. A process which comprises contacting ethylene at a temperature in the range of about 100 to about 450° F. with a catalyst prepared by impregnating a silica-alumina composite with an aqueous solution consisting of a ferric compound calcinable to ferric oxide, drying the resulting composite, and heating in a dry oxygen-containing atmosphere at a temperature in the range of about 350 to about 1500° F. for a sufficient time to produce a substantial activation of said catalyst for said process, and recovering a normally solid polymer of ethylene.

References Cited in the file of this patent

UNITED STATES PATENTS

| | | |
|---|---|---|
| 2,212,155 | Ellis | Aug. 20, 1940 |
| 2,581,228 | Bailey et al. | Jan. 1, 1952 |
| 2,589,189 | Ciapetta et al. | Mar. 11, 1952 |
| 2,606,940 | Bailey et al. | Aug. 12, 1952 |
| 2,666,756 | Boyd | Jan. 19, 1954 |
| 2,726,231 | Field et al. | Dec. 6, 1955 |
| 2,791,575 | Feller et al. | May 7, 1957 |
| 2,825,721 | Hogan et al. | Mar. 4, 1958 |

UNITED STATES PATENT OFFICE

CERTIFICATE OF CORRECTION

Patent No. 2,930,788            March 29, 1960

Robert L. Banks

It is hereby certified that error appears in the printed specification of the above numbered patent requiring correction and that the said Letters Patent should read as corrected below.

Column 6, line 48, after "to", first occurrence, insert -- about --.

Signed and sealed this 27th day of September 1960.

(SEAL)
Attest:

KARL H. AXLINE
Attesting Officer

ROBERT C. WATSON
Commissioner of Patents